United States Patent
Firouzbakhsh et al.

(10) Patent No.: US 9,802,128 B2
(45) Date of Patent: Oct. 31, 2017

(54) DISPLAY APPARATUS, SERVER, AND METHOD FOR PROVIDING CONTENTS

(71) Applicant: SAMSUNG ELECTRONICS CO., LTD., Suwon-si, Gyeonggi-do (KR)

(72) Inventors: Navid Firouzbakhsh, Seoul (KR); Ty Ahmad-Taylor, Brooklyn, NY (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 263 days.

(21) Appl. No.: 14/827,659

(22) Filed: Aug. 17, 2015

(65) Prior Publication Data

US 2016/0059133 A1 Mar. 3, 2016

(30) Foreign Application Priority Data

Aug. 29, 2014 (KR) .................. 10-2014-0114069

(51) Int. Cl.
| | | |
|---|---|---|
| *A63F 13/00* | (2014.01) | |
| *A63F 13/795* | (2014.01) | |
| *A63F 13/32* | (2014.01) | |
| *A63F 13/323* | (2014.01) | |
| *A63F 13/35* | (2014.01) | |
| *A63F 13/87* | (2014.01) | |
| *A63F 13/335* | (2014.01) | |

(52) U.S. Cl.
CPC .......... *A63F 13/795* (2014.09); *A63F 13/32* (2014.09); *A63F 13/323* (2014.09); *A63F 13/335* (2014.09); *A63F 13/35* (2014.09); *A63F 13/87* (2014.09)

(58) Field of Classification Search
CPC ........ H04N 21/42225; H04N 21/4131; H04W 8/005
See application file for complete search history.

(56) References Cited

U.S. PATENT DOCUMENTS

| 8,971,967 | B2 | 3/2015 | Izutsu | |
|---|---|---|---|---|
| 2012/0086563 | A1* | 4/2012 | Arling | .................. G06F 3/0486 340/12.52 |
| 2013/0035143 | A1 | 2/2013 | Izutsu | |

(Continued)

FOREIGN PATENT DOCUMENTS

| CN | 102844731 | 12/2012 |
|---|---|---|
| CN | 103179026 | 6/2013 |

(Continued)

OTHER PUBLICATIONS

Extended Search Report dated Feb. 9, 2016 in counterpart European Application No. 15181720.2.

*Primary Examiner* — Reginald Renwick
(74) *Attorney, Agent, or Firm* — Nixon & Vanderhye, P.C.

(57) ABSTRACT

A display apparatus is disclosed. The display apparatus according to an example embodiment includes: a first communication unit configured to communicate with a server; a second communication unit configured to communicate with an external apparatus; a display unit configured to display a message received from the server through the first communication unit; and a controlling unit configured to control the second communication unit so as to transmit a signal turning-on the external apparatus to the external apparatus, in response to a user command responding to the displayed message being received.

20 Claims, 9 Drawing Sheets

(56) References Cited

U.S. PATENT DOCUMENTS

2014/0355583 A1* 12/2014 Wang ................... H04W 4/08
                                                  370/338
2015/0033275 A1*  1/2015 Natani ............. H04N 21/42225
                                                  725/110
2015/0373765 A1* 12/2015 Lee ..................... H04W 8/005
                                                  370/329

FOREIGN PATENT DOCUMENTS

| EP | 2 747 439 | 6/2014 |
| WO | 2011/052980 | 5/2011 |
| WO | 2014/166263 | 10/2014 |

\* cited by examiner

| ID 1 | Device1 | Teahun's invite: F1 Racing |
|---|---|---|
| Accept | Reject | Block |

FIG. 6

| ID 1 | Device1 | Teahun is playing F1 Racing |
| ID 2 | Device2 | Shinyoung is playing Golf 24 |
| ID 3 | Device3 | Sunchul is waiting for new game |

FIG. 7

| Starwalls | The Empire Strikes Back | Navid,Woonsun,.. |
|---|---|---|
| ROL | Chobo play | Shinyoung, Sunchul, Teahun,... |
| Beautiful Story | 1:1 anyone | Miss Park is waiting |

DISPLAY APPARATUS, SERVER, AND METHOD FOR PROVIDING CONTENTS

CROSS-REFERENCE TO RELATED APPLICATIONS

This application is based on and claims priority under 35 U.S.C. §119 to Korean Patent Application No. 10-2014-0114069, filed on Aug. 29, 2014, in the Korean Intellectual Property Office, the disclosure of which is incorporated herein by reference in its entirety.

BACKGROUND

Field

The example embodiments relate to a display apparatus, and more particularly, to a display apparatus, a server, and a method for providing contents capable of alleviating boredom caused by a contents execution standby of a user and saving power.

Description of Related Art

In accordance with a development of a multimedia industry, a gaming population has been rapidly increased. According to statistical data, it has been estimated that a population who enjoys an interactive gaming stands at about 1.2 billion people and an online gaming population exceeds 0.7 billion people.

In the online game, since a plurality of users located at remote positions enjoy together the game, a function showing a user list, a game invitation function, a mutual interaction function, and the like online are important. When most video game consoles supporting the online game are turned-on and operated, the above-mentioned functions are typically provided.

However, in the case in which a display apparatus connected to the game console displays contents different from the game, a game screen may not be displayed even in the case in which the game console executes a game program. Therefore, the display apparatus is put in a state in which the display apparatus may not accept the game matching request even when there is a game matching request from other users as Additionally, the display apparatus may not know states of other users on a game server.

On the other hand, in the case in which the game console executes the game program so that the display apparatus displays the game on the screen, the display apparatus may not display contents different from the game program. However, in the case in which the game program is executed, it often takes a long time to request a game invitation to other users or wait for a game invitation request of other users, and even in this case, a state in which the game screen is displayed should be maintained. Therefore, the user feels boredom and wastes time.

In addition, since the game console continues to execute the game program even in the case in which the user requests the game invitation or waits the invitation request, a system resource is consumed, which causes power consumption to be increased.

SUMMARY

Example embodiments may overcome the above disadvantages and other disadvantages not described above.

Example embodiments provide a display apparatus, a server, and a method for providing contents capable of letting a contents execution wait in a state in which an external apparatus is turned-off while watching other contents through the display apparatus, and immediately turning-on the external apparatus in the case in which contents of the external apparatus need to be executed.

According to an aspect of the example embodiments, a display apparatus includes: a first communication unit or circuit configured to communicate with a server; a second communication unit or circuit configured to communicate with an external apparatus; a display configured to display a message received from the server through the first communication unit; and a controller configured to control the second communication unit or circuit to transmit a signal turning-on the external apparatus to the external apparatus, when a user command responding to the displayed message is received.

The message received from the server may include at least one of a contents title, identification information of other users, and state information of other users, etc.

The message received from the server may include a game matching request message from other users, and the controller may be configured to control the second communication unit to transmit the signal turning-on the external apparatus to the external apparatus, when a user command corresponding to the game matching request message accepting the game matching request message is received.

The message received from the server may include a game matching request message from other users, and the controller may be configured to not transmit the signal turning-on the external apparatus to the external apparatus, when a user command corresponding to the game matching request message rejecting the game matching request message is received.

The external apparatus may be a game console.

The second communication unit or circuit may communicate with the external apparatus using any one of, for example, a fast wired interface, web-API, and wake-on-LAN, or the like.

The fast wired interface may include, for example, any one of a high definition multimedia interface (HDMI), a mobile high-definition link (MHL), and a digital interactive interface for video & audio (DiiVa), or the like.

The display may display at least one of information of friends, information of ongoing game, and information of other users.

The controller may be configured to control the display to receive and display a contents screen from the external apparatus, when the external apparatus is turned-on.

The controller may be configured control the first communication unit or circuit to transmit a game matching request to the server, when a user command requesting a game matching with other users is received.

According to another aspect of the example embodiments, a server includes: a communication unit or circuitry configured to communicate with a display apparatus; a storage configured to receive and store user information from a game server; and a controller configured to control the communication unit or circuitry to transmit a game matching request message to the display apparatus of a user included in a received game matching request, when a game matching request is received from the display apparatus.

According to another example embodiment, a method for providing contents includes: receiving a message from a server; displaying the received message on a screen; and when a user command responding to the displayed message is received, transmitting a signal turning-on an external apparatus to the external apparatus.

The received message may include at least one of a contents title, identification information of other users, and state information of other users.

The received message may include a game matching request message from other users, and in the transmitting of the signal turning-on the external apparatus, when a user command corresponding to the game matching request message so as to accept the game matching request message is received, the signal turning-on the external apparatus may be transmitted to the external apparatus.

The external apparatus may be a game console.

Transmitting of the signal turning-on the external apparatus, communication with the external apparatus may be performed by using any one of a fast wired interface, web-API, and wake-on-LAN, or the like.

The fast wired interface may include, for example, any one of a high definition multimedia interface (HDMI), a mobile high-definition link (MHL), and a digital interactive interface for video & audio (DiiVa), or the like.

The method may further include receiving a contents screen from the external apparatus and displaying the contents screen from the external apparatus, when the external apparatus is turned-on.

The method may further include an operation of transmitting a game matching request to the server when a user command requesting a game matching with other users is received.

BRIEF DESCRIPTION OF THE DRAWING FIGURES

The above and/or other aspects and advantages of the example embodiments will become more apparent from the following detailed description taken in conjunction with the accompanying drawings in which like reference numerals refer to like elements, and wherein.

DETAILED DESCRIPTION

Various example embodiments will be described with reference to the accompanying drawings.

Figure 1:
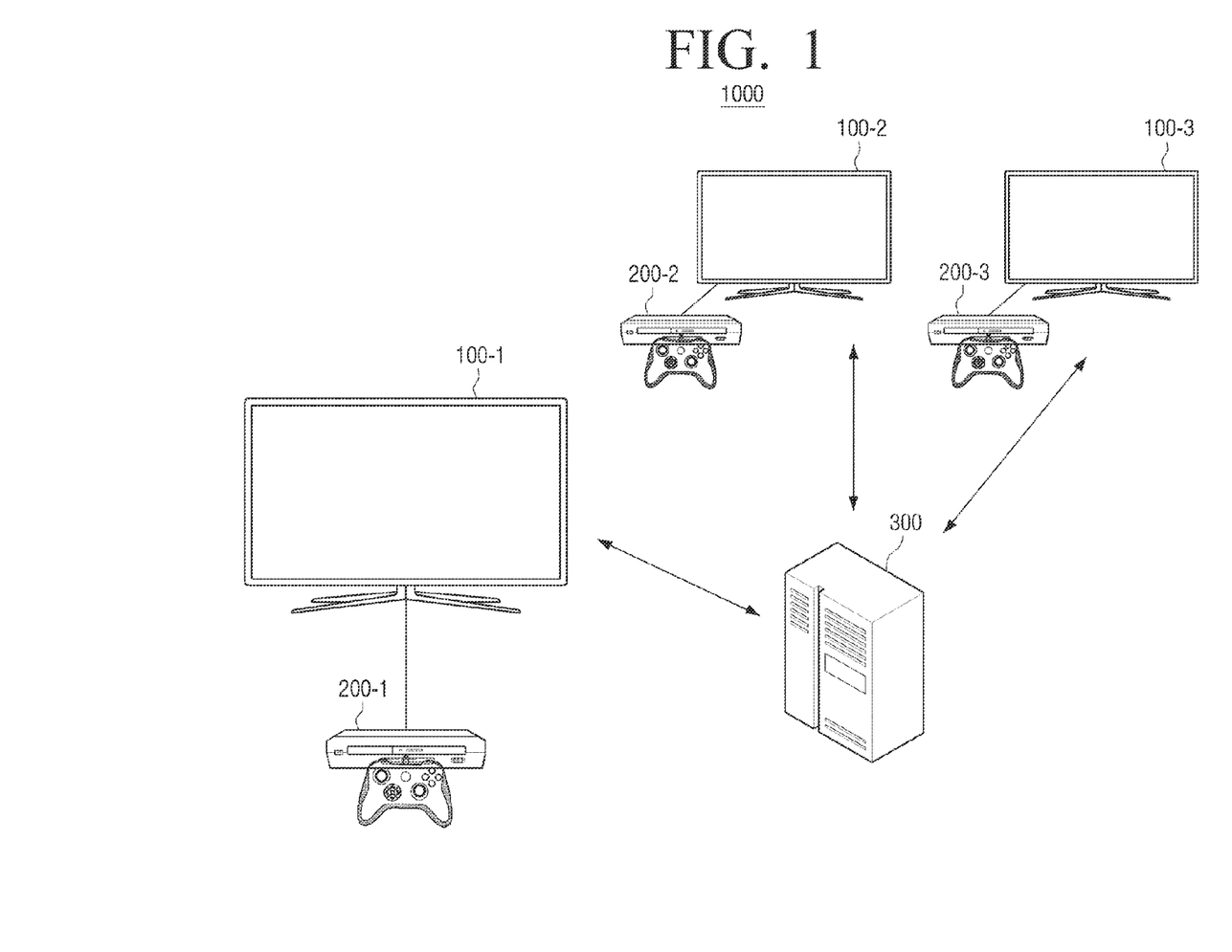
FIG. 1 is a conceptual diagram illustrating a contents providing system according to an example embodiment.

FIG. 1 is a conceptual diagram illustrating a contents providing system according to an example embodiment.

Referring to FIG. 1, a contents providing system 1000 according to an example embodiment may include, for example, a plurality of display apparatuses 100-1, 100-2, and 100-3 which are each operably connected to a plurality of external apparatuses 200-1, 200-2, and 200-3, and a server 300.

The display apparatuses 100-1, 100-2, and 100-3 display an image, or display contents provided by the external apparatuses 200-1, 200-2, and 200-3. The server 300 relays the plurality of display apparatuses 100-1, 100-2, and 100-3 and processes various requests. The server 300 processes a request transmitted from any one of display apparatuses. For example, in the case in which users of the plurality of display apparatuses 100-1, 100-2, and 100-3 jointly play a game, if any one of display apparatuses requests information of other users, the server 300 provides the information of other users to the appropriate above-mentioned display apparatus. In addition, when there is a game matching request from any one of display apparatuses, the server 300 transmits the above-mentioned game matching request to other display apparatuses. To this end, the server 300 manages network address information and user identification information of the respective display apparatuses 100-1, 100-2, and 100-3. In the case in which there is a game matching request from any one of display apparatuses and the server 300 transmits the game matching request to other display apparatuses, when other display apparatuses accept the game matching request, the server 300 may also be operated as a game relay server. However, in the case in which a game server separately exists, the server 300 may also request a game relay to the game server.

In the case in which the display apparatuses 100-1, 100-2, and 100-3 connected to the external apparatuses 200-1, 200-2, and 200-3 display contents different from the game, the display apparatuses 100-1, 100-2, and 100-3 may not display a game screen even in the case in which the external apparatuses 200-1, 200-2, and 200-3 execute the game program. Therefore, the display apparatuses are put into a state in which the display apparatuses may not accept the game matching request even when there is the game matching request from other users. Additionally, the display apparatuses may not know states of other user online.

On the other hand, in the case in which the external apparatuses 200-1, 200-2, and 200-3 execute the game program and a game channel is set in the display apparatuses 100-1, 100-2, and 100-3, the display apparatuses may not display contents different from the game program. In this case, it often takes a long time to request a game invitation to other users or wait for a game invitation request of other users. In this case, since a state in which the game screen is displayed while the external apparatuses 200-1, 200-2, and 200-3 are executed should be maintained, the user feels boredom and wastes time.

In addition, since the external apparatuses 200-1, 200-2, and 200-3 should continue to execute the game program even in the case in which the user requests the game invitation or waits for the invitation request, a system resource is consumed, which causes power consumption to be increased.

According to an example embodiment, in the case in which the display apparatuses 100-1, 100-2, and 100-3 does not receive the contents from the external apparatuses 200-1, 200-2, and 200-3 as in the case in which the display apparatuses 100-1, 100-2, and 100-3 do not execute the game with other users, the display apparatuses 100-1, 100-2, and 100-3 turn-off the external apparatuses 200-1, 200-2, and 200-3. In this case, the display apparatuses 100-1, 100-2, and 100-3 normally display other contents. When a message is received from other display apparatuses, the message is displayed on the screen. The message may have various forms, for example, a chat between the users, information of other users, information of ongoing game, information of friends, and the like. If the display apparatus 100 needs to receive the contents from the external apparatuses due to a game matching, or the like during the execution of transmission/reception and display of the message, the display apparatus 100 transmits a signal that turns-on the external apparatus 200 connected thereto to turn-on the external apparatus.

Configurations and operations of the display apparatus 100 and the server 300 will be described in more detail below.

Figure 2:
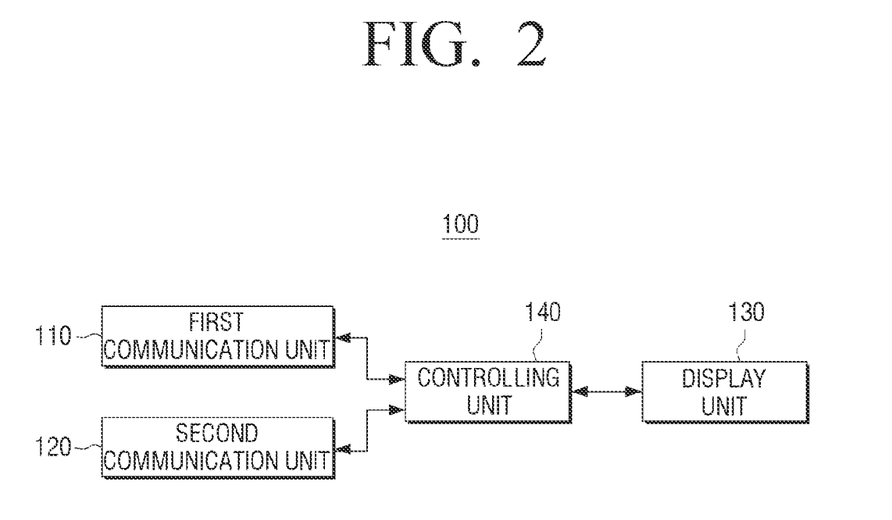
FIG. 2 is a block diagram illustrating a configuration of a display apparatus according to an example embodiment.

FIG. 2 is a block diagram illustrating a configuration of the display apparatus 100 according to an example embodiment.

Referring to FIG. 2, the display apparatus 100 according to an example embodiment includes a first communication unit 110, a second communication unit 120, a controlling unit 140, and a display unit 130.

The first communication unit 110 is a configured to communicate with the server. Specifically, the first communication unit 110 receives the request of other display apparatuses or receives at least one of the information of friends, the information of ongoing game, and the information of other users from the server 300. The request from other display apparatuses may be, for example, the game matching request inviting to the game, the chat message, or the like. The information of friends indicates user information registered online as the friend, the information of ongoing game indicates information of currently ongoing game online, and the information of other users indicates information of other users who are not friends, but are online.

The first communication unit 110 may be implemented by various technical means. The first communication unit 110 may also be implemented by a local area communication network and a mobile communication network, but in the case in which the server 300 is accessed via the Internet to provide a service, the first communication unit 110 may include a network interface card according to TCP/IP, which is a standard protocol for transmitting information from Internet. TCP is a regulation about a technology that partitions and packages transmission data into a predetermine unit, and IP is a regulation about a technology that directly transmits and receives data. The network interface card may include a PCI interface for connection with a PCI bus, which is an internal bus, a MAC processing unit for processing media access control (MAC), which is an upper layer, a physical layer (PHY) device for processing a physical layer, a buffer required to process packets, a boot ROM, a connector, and the like.

The second communication unit 120 is configured to communicate with the external apparatus 200. For example, the second communication unit 120 may, for example, transmit a turn-on signal of the external apparatus 200 to the external apparatus 200, in the case in which the second communication unit 120 needs to receive the contents from the external apparatus 200 as a result of a user interaction. Similarly, the second communication unit 120 transmits a turn-off signal of the external apparatus 200 to the external apparatus 200, in the case in which the second communication unit 120 does not need to receive the contents from the external apparatus 200 because the user watches other contents, or the like. In addition, in the case where the external apparatus 200 is turned-on, the second communication unit 120 receives a contents screen from the external apparatus 200.

The second communication unit 120 may be implemented by various technical means. That is, the second communication unit 120 may communicate with the external apparatus using any one of, for example, a fast wired interface, web-API, and wake-on-LAN.

The fast wired interface may be any one of a high definition multimedia interface (HDMI), a mobile high-definition link (MHL), and a digital interactive interface for video & audio (DiiVa).

The web API is an application programming interface for a web server and a web browser. The web API of the server is defined as a request-response system, and may be represented by JSON or XML. The client web API, which is a program interface that extends a function within the web browser or another HTTP client, may have a form of a native plug-in architecture and may be a standardized JavaScript binding.

The wake-on-LAN is a technology in which a network manager powers up several electronic apparatuses at remote locations or may switch a computer which is in a sleep mode into a normal state. The wake-on-LAN is executed by transmitting a wake-on frame or a specific packet from the server in which an application for a remote control on a network is installed to the electronic apparatus, which is a target of the remote control, even in the case in which the electronic apparatus is turned-off. In this case, if the electronic apparatus receives the specific packet by supplying power to a network adaptor device in the electronic apparatus so as to receive the wake-on frame or the specific packet, the turned-off apparatus may be remotely waked. The wake-on-LAN has an advantage that security is excellent.

The display unit 130 is configured to display contents. Particularly, the display unit 130 displays the message received from the server 300 through the first communication unit 110, and displays the contents received from the external apparatus 200 in the case in which it is determined that the contents need to be received from the external apparatus 200 and the turn-on signal is transmitted to the external apparatus 200, such that the external apparatus 200 is turned-on.

The display unit 130 displays an image using a signal processed image signal. The display unit 130 may include, for example, a scaler (not shown), a frame rate converter (not shown), a video enhancer (not shown), and a display module (not shown). The scaler adjusts a picture ratio of the image. The video enhancer removes deterioration or noise of the image, such that processed image data is stored in a frame buffer. The frame rate converter adjusts a frame rate, and the image data of the frame buffer is transmitted to the display module according to a set frame rate.

The display module, which is a circuit configuration outputting the image to a display panel (not shown), may include a timing controller (not shown), a gate driver (not shown), a data driver (not shown), and a voltage driving unit (not shown).

The timing controller (not shown) generates a gate control signal (a scan control signal) and a data control signal (a data signal), and realigns R, G, B data which is received so as to be supplied to the data driver (not shown). The gate driver (not shown) applies gate on/off voltages (Vgh/Vgl) provided from the voltage driving unit according to the gate control signal generated by the timing controller to the display panel. The data driver (not shown) completes a scaling according to the data control signal generated by the timing controller (not shown) and inputs the RGB data of the image frame to the display panel. The voltage driving unit (not shown) generates the respective driving voltages and transfers the generated driving voltages to the gate driver, data driver, the display panel, and the like.

The display panel may be implemented by various display technologies such as an organic light emitting diode (OLED), a liquid crystal display (LCD) panel, a plasma display panel (PDP), a vacuum fluorescent display (VFD), a field emission display (FED), an electro luminescence display (ELD), and the like. The display panel is mainly formed of a light emission type, but a reflective display (E-ink, P-ink, Photonic Crystal) is not excluded. In addition, the display panel may be implemented as a flexible display, a transparent display, and the like.

The controlling unit 140 is configured to control a general operation of the display apparatus 100. The controlling unit 140 controls the second communication unit 120 so as to generate the turn-on signal of the external apparatus 200 and transmit the generated turn-on signal to the external apparatus 200, in the case in which the second communication unit 120 needs to receive the contents from the external apparatus 200 as a result of an interaction between a plurality of users of a plurality of display apparatuses. Similarly, the controlling unit 140 controls the second communication unit 120 so as to generate the turn-off signal of the external apparatus 200 and transmit the generated turn-off signal to the external apparatus 200, in the case in which the second communication unit 120 does not need to receive the contents from the external apparatus 200 because the user watches other contents, or the like.

If the external apparatus 200 receives the turn-off signal, the external apparatus 200 turns-off power from a turn-on state and enters a standby state. On the other hand, if the external apparatus 200 receives the turn-on signal, the external apparatus 200 turns-on power from a turn-off state, boots an operating system, and executes the application. In the case in which the external apparatus 200 is turned-on, the display apparatus 100 controls the display unit 130 so as to receive the contents screen from the external apparatus 200 and display the received contents screen.

For example, if a user command in response to the message displayed on the display unit 130 is input and received, the controlling unit 140 controls the second communication unit 120 so as to generate a signal which turns-on the external apparatus 200 and transmit the generated turn-on signal to the external apparatus 200.

The controlling unit 140 may include, for example, hardware configurations such as a micro processing unit (MPU), a central processing unit (CPU), a cache memory, a data bus, and the like, an operating system, and a software configuration of an application performing a specific purpose. Control instructions for the respective components for an operation of the display apparatus 100 according to a system clock are read from the memory, and the controlling unit 140 operates the respective components of hardware by generating an electrical signal according to the read control instructions.

In addition, although not shown in FIG. 2, the display apparatus 100 may further include an additional component for receiving and displaying a broadcasting signal.

That is, the display apparatus 100 may further include a receiving unit (not shown) receiving broadcasting contents.

The receiving unit is a configuration receiving the respective contents and information associated with the contents from the outside. The receiving unit may receive broadcasting program contents from a broadcasting station using a broadcasting network, and may receive the contents from the web server using Internet. In the case in which the receiving unit receives the contents from the web server using Internet, the receiving unit may be replaced with the first communication unit 110 described above.

In the case in which the receiving unit receives the contents from the broadcasting station, the receiving unit may include configurations such as a tuner unit (not shown), a demodulating unit (not shown), and the like.

The tuner unit selects an RF broadcasting signal corresponding to a selected channel among RF broadcasting signals received through an antenna, and converts the selected RF broadcasting signal into an intermediate frequency signal or a baseband image or a sound signal. In the case in which the selected RF broadcasting signal is a digital broadcasting signal, the tuner unit converts the selected RF broadcasting signal into a digital IF signal, and in the case in which the selected RF broadcasting signal is an analog broadcasting signal, the tuner unit converts the selected RF broadcasting signal into the baseband image or the sound signal (CVBS SIF).

The demodulating unit (not shown) receives the digital IF signal converted by the tuner unit and performs a demodulation operation for the received digital IF signal. In the case in which the digital IF signal output from the tuner unit is an ATSC scheme, the demodulating unit performs 8-vestigal side band (VSB) demodulation. In the case in which the digital IF signal output from the tuner unit is a DVB scheme, the demodulating unit performs coded orthogonal frequency division modulation (COFDMA) demodulation. In addition, the demodulating unit may perform a channel decoding such as trellis decoding, deinterleaving, Reed-Solomon decoding, or the like.

In the case in which the demodulating unit performs the channel decoding, a stream signal TS is output. The stream signal may be a signal obtained by multiplexing the image signal, the sound signal, and the data signal. For example, the stream signal may be MPEG-2 TS that the image signal of MPEG-2 standard, the sound signal of Dolby AC-3 standard, and the like are multiplexed. The stream signal output from the demodulating unit is input to the signal processing unit.

The receiving unit may receive the contents from various external apparatuses in addition to Internet, and in this case, the receiving unit may be replaced with the second communication unit 120 described above. In this case, the second communication unit (i.e., receiving unit) may include at least one of a composite video banking sync (CVBS) terminal, a component terminal, an S-video terminal (analog), a digital visual interface (DVI) terminal, a high definition multimedia interface (HDMI) terminal, an RGB terminal, a D-SUB terminal, an IEEE1394 terminal, an SPDIF terminal, a liquid HD terminal, and an USB terminal.

In addition, the receiving unit may include various wireless communication modules. The receiving unit may include local area communication modules such as a WIFI module, a Bluetooth module, a near field communication (NFC) module, a Zigbee module, a radio frequency identification (RFID) module, an infrared data association (IrDa) module, an ultra wideband (UWB) module, and the like. In addition, the receiving unit may also be implemented by 3G mobile communication modules such as Wideband CDMA (WCDMA), High Speed Downlink Packet Access (HSDPA), High Speed Uplink Packet Access (HSUPA), and High Speed Packet Access (HSPA), 4G mobile communication modules such as Mobile WiMAX and WiBro, and 4G Long Term Evolution (LTE), or the like.

Further, the receiving unit may also receive the contents from a set top box. The set top box may support bidirectional communication to support IP TV.

The display apparatus 100 may further include a signal processing unit (not shown) for performing a signal processing for the received contents.

The signal processing unit is a configuration processing a signal for image information and sound information configuring the contents. If the signal processing unit receives the stream signal, the signal processing unit may separate the image signal, the sound signal, and the data signal by de-multiplexing the stream signal. In the case in which the de-multiplexed image signal is a coded image signal, the signal processing unit performs decoding using a decoder. For example, the signal processing unit may decode a coded image signal of MPEG-2 standard by the decoder, and may decode an image signal of H.264 standard of digital multimedia broadcasting (DMB) or DVB-H by an H.264 decoder. In addition, the signal processing unit may process brightness, tint, tone, and the like of the image signal.

In addition, the signal processing unit may also process a de-multiplexed sound signal. For example, the signal processing unit may decode a coded sound signal of MPEG-2 standard by an MPEG-2 decoder, and may decode a coded sound signal of MPEG-4 bit sliced arithmetic coding (BSAC) standard of terrestrial digital multimedia broadcasting (DMB) by an MPEG-4 decoder. In addition, the signal processing unit may decode a coded sound signal of MPEG-2 advanced audio codec (AAC) standard of a DMB scheme or a DVB-H scheme by an AAC decoder. In addition to this, the signal processing unit may adjust base, treble, volume, and the like.

Further, the signal processing unit may perform a data processing of the de-multiplexed data signal. The signal processing unit may decode the coded data and may include an electric program guide (EPG) indicating information for a program broadcasted in each channel by the coded data. In the case of ATSC scheme, EPG may be ATSC-program and system information protocol (TSC-PSIP) information, and in the case of DVB scheme, EPG may include DVB-service information (DVB-SI) information.

In addition, the display apparatus 100 may further include an interface unit (not shown) for receiving the user command.

The interface unit may include at least one physical button or touch panel. The user presses the button or touches an object on the touch panel, such that corresponding control instructions are generated and the display apparatus 100 is operated according to the generated control instructions.

On the other hand, the interface unit may include the local area communication module described above and receive the control signal transmitted from a remote control apparatus through the local area communication module. The user presses the button on a remote controller, or the like, such that the control instructions are generated from the remote controller and the interface unit receives the generated control instructions and transmits the control instructions to the controlling unit 140. In the case in which the remote controller includes the touch panel or a motion sensor, a touch of the user or a motion of the remote controller generates the control instructions.

In order to recognize a gesture of the user, the interface unit may include a means for photographing the gesture of the user. That is, the display apparatus 100 includes at least one camera and processes an optical signal sensed by the camera to generate an image. In addition, the display apparatus 100 recognizes the gesture of the user by detecting a change rate of the image over time and converts the gesture into the control instructions.

The interface unit may also generate corresponding control instructions by recognizing voice of the user.

In the case in which the game matching request is received from other users in the example embodiment, the user command for accepting or rejecting the game matching may be received through the interface unit.

The display apparatus 100 according to various example embodiments described above may include one or more displays, and may be implemented, for example, by any one of a digital television, a tablet, a personal computer (PC), a portable multimedia player (PMP), a personal digital assistant (PDA), a smart phone, a cellular phone, a digital frame, a digital signage, and kiosk, or the like, as a device configured to execute the application or display the contents.

Figure 3:
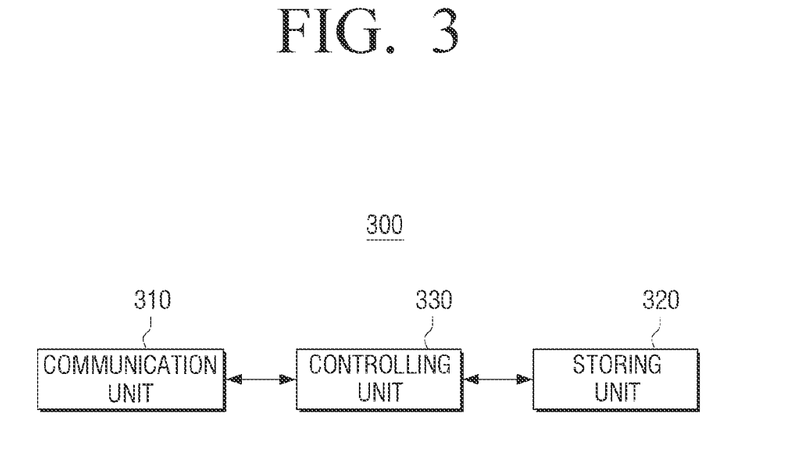
FIG. 3 is a block diagram illustrating a configuration of a server according to an example embodiment.

FIG. 3 is a block diagram illustrating a configuration of the server 300 according to an example embodiment.

Referring to FIG. 3, the server 300 according to an example embodiment includes a storing unit 320, a communication unit 310, and a controlling unit 330.

The communication unit 310 is configured to communicate with the display apparatus 100. For example, in the case in which the display apparatus 100 requests information of other users, the communication unit 310 may read and provide the information of other users stored in the storing unit 320. In the case in which another server (e.g., a game server) manages user information, the communication unit 310 may receive the user information from another server and transmit the user information to the display apparatus 100. The user information transmitted to the display apparatus 100 may, for example, be displayed in a message form. The communication unit 310 may provide a variety of information such as information of ongoing game, information of friends, and the like, in addition to the user information.

In addition, the communication unit 310 may also serve to receive an input from the display apparatus 100 and transmit the input to the controlling unit 330. For example, the communication unit 310 may receive a game matching acceptance or rejection response, a chat message, or the like from the display apparatus 100 and transmit the game matching acceptance or rejection response, the chat message, and the like to the controlling unit 330. The controlling unit 330 performs a corresponding operation according to a response content.

In addition, the communication unit 310 may also provide the contents to be provided to the user by the display apparatus 100 to the display apparatus 100. For example, in the case in which the game requires an application operated in the server and the client and the game starts in a state in which the display apparatus 100 and the external apparatus 200 connected to the display apparatus 100 do not have a client application, a client application package may be transmitted to the display apparatus 100 through the communication unit 310.

The communication unit 310 may be implemented by various technologies, similar to the display apparatus 100 described above. That is, the communication unit may be implemented by the local area communication means and the mobile communication means, and may conform TCP/IP, which is a standard protocol for transmitting information from the Internet particularly in the case in which the server 300 is accessed via the Internet to provide the service. In this case, the communication unit 310 may include the network interface card, and the network interface card may include a PCI interface for connection with a PCI bus, which is an internal bus, a MAC processing unit for processing media access control (MAC), which is an upper layer, a physical layer (PHY) device for processing a physical layer, a buffer required to process packets, a boot ROM, a connector, and the like.

The storing unit 320 is a storage configured to store user information. Particularly, the storing unit 320 may receive and store information on users using a contents service from an external server. However, the storing unit 320 may also be implemented so as to receive and use the user information from the external server in real time at the time of provision of the service while not storing the user information. In the case in which a game service is provided, the storing unit 320 receives and stores the user information from the game server.

The storing unit 320 may store the user information in a database form. In this case, the kind of database is not limited. That is, the database may be any one of hierarchical database (HDB), relational database (RDB), and object-oriented database (OODB), or the like. In the case in which another server establishes the database, the database may also be implemented as network database (NDB) in addition to the above-mentioned types of database.

The controlling unit 330 controls a general operation of the server 300. In the case in which the display apparatus 100 requests information of other users, the controlling unit 330 may read the information of other users stored in the storing unit 320 and provide the information of other users to the display apparatus 100. In the case in which another server (e.g., a game server) manages user information, the controlling unit 330 may receive the user information from another server and transmit the user information to the display apparatus 100. The controlling unit 330 may provide a variety of information such as information of ongoing game, information of friends, and the like, in addition to the user information.

In addition, the controlling unit 330 receives and processes an input from the display apparatus 100 through the communication unit 310. For example, in the case in which controlling unit 330 receives a game matching acceptance or rejection response, a chat message, or the like from the display apparatus 100, the controlling unit 330 processes the game matching acceptance or rejection response, the chat message, and the like. In the case of game matching acceptance, the controlling unit 330 executes the game or requests a game execution to a separate game server. In the case in which a game matching rejection is received, the controlling unit 330 transmits a message to the display apparatus requesting game matching informing that the game matching is rejected. In the case in which the display apparatus 100 requests the user information or the information of friends, the controlling unit 330 reads corresponding information from the storing unit 320 or receives the corresponding information from another server so as to provide. In addition, the controlling unit 330 transmits the chat message or the game request to a destination display apparatus in a message form.

In addition, the controlling unit 330 may also control the communication unit 310 to provide the contents to be provided to the user by the display apparatus 100 to the display apparatus 100. For example, in the case in which the game requires an application operated in the server and the client and the game starts in a state in which the display apparatus 100 and the external apparatus 200 connected to the display apparatus 100 do not have a client application, the controlling unit 330 performs a control so that a client application package is transmitted to the display apparatus 100 through the communication unit 310.

Figure 4:
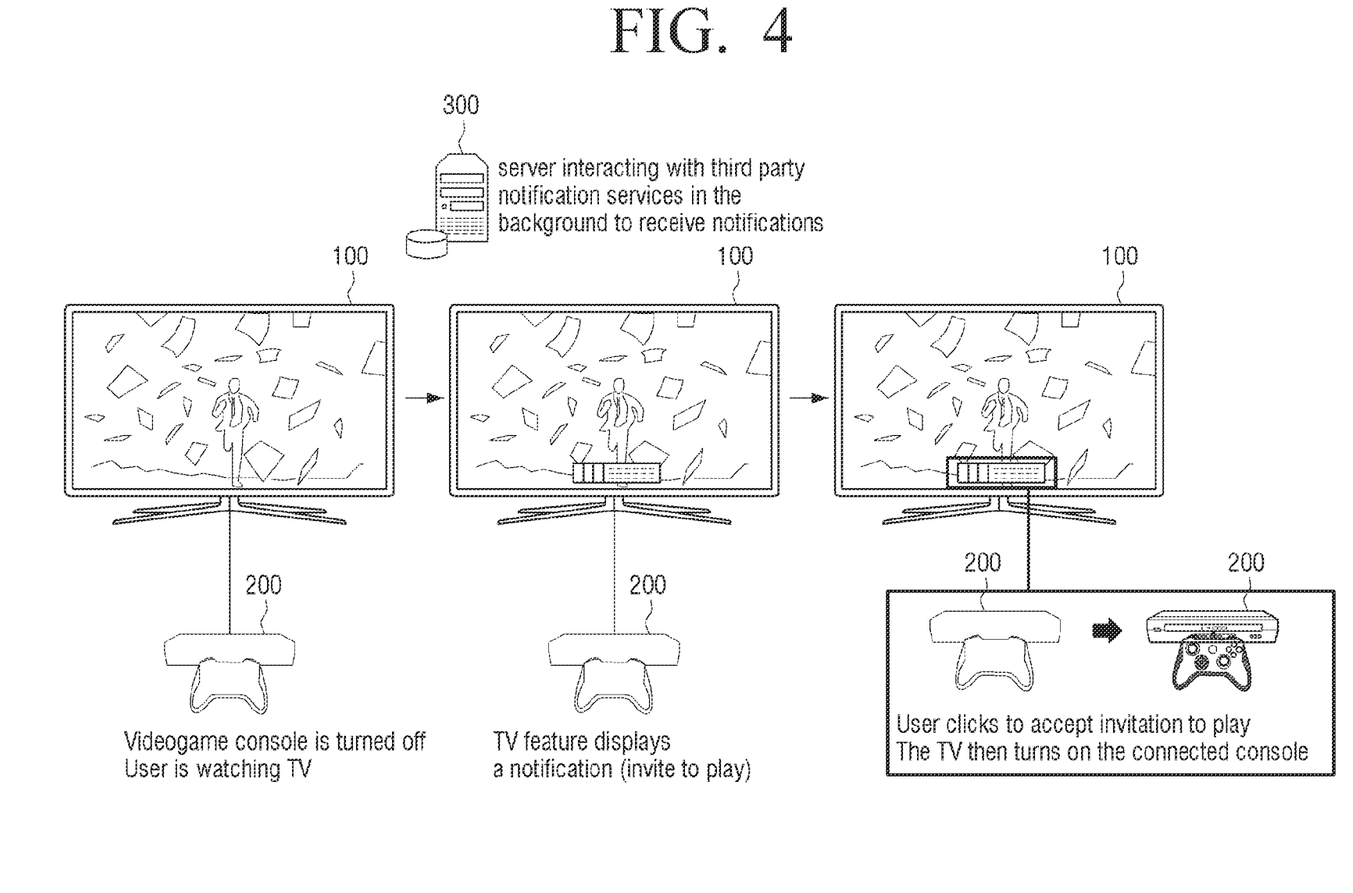
FIG. 4 is a diagram illustrating operations of a display apparatus and an external apparatus according to an example embodiment.

FIG. 4 is a diagram illustrating operations of the display apparatus and the external apparatus according to an example embodiment.

According to the example embodiment illustrated in FIG. 4, the display apparatus 100 is TV, and the external apparatus 200 is a video game console. However, the display apparatus is not limited to the above-mentioned example embodiment. For example, the display apparatus 100 may be various apparatuses providing the contents to the display apparatus and the external apparatus 200 may be various apparatuses providing a contents source. However, the present specification will describe the TV and the game console connected to the TV for convenience as an example embodiment.

In the case in which the user waits the game matching acceptance after the user requests the game matching, or waits the game matching request, the user feels boredom and wastes time. Therefore, the TV 100 according to an example embodiment transmits a turn-off signal to the game console 200 to turn-off the game console 200. In addition, the TV 100 displays broadcasting contents or other contents. In the case in which the game matching acceptance or the game matching request is received from the display apparatuses of other users on the network in a state in which the TV 100 displays other contents, the server 300 transmits the game matching acceptance or the game matching request to the TV. The TV displays the game matching acceptance or the game matching request in a pop-up message form. In this case, other contents which are displayed are not influenced. That is, the game matching acceptance or the game matching request is displayed in the pop-up message form on one region of the screen while other contents are displayed.

In this case, the user may respond to the message through the remote controller or other interfaces. In the case in which the game matching request message is displayed, if the user inputs a response accepting the game matching request message, the server 300 sets the game. The server 300 may also directly perform the game setting and may also request the game setting to a separate game server. In this case, the TV 100 transmits a turn-on signal to the game console 200 to turn-on the game console 200. In addition, the TV 100 changes the channel to the game channel. In the case in which the TV 100 displays a message inquiring whether or not to change the channel and a user input instructing a channel change is received, the TV 100 may also change the channel. In addition, in the case in which the game console 200 shares the channel with a broadcasting service, the channel change may not be performed. The game console 200 boots the operating system and executes the application. If the game console 200 does not have the application, the game console 200 may download the application from the server 300 or the separate game server and may execute the application.

However, in the case in which the game matching acceptance is received, the following operation may be performed without the input of the user. That is, since this case corresponds to a case in which the game matching is performed, the channel is automatically changed to the game channel and the turn-on signal is transmitted to the game console 200, thereby turning-on the game console 200. Similarly, the game console 200 boots the operating system and executes the application. The server 300 may also set the game or may also request the game setting to the separate game server.

Figure 5:
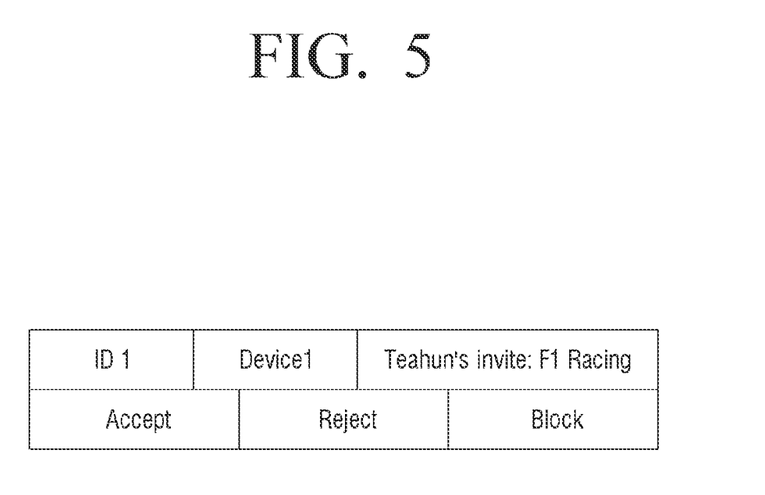
FIG. 5 is a diagram illustrating a pop-up message according to an example embodiment.

FIG. 5 is a diagram illustrating a pop-up message according to an embodiment.

As illustrated in FIG. 5, the pop-up message according to an example embodiment may be a game matching request message (invitation message). The invitation message may include at least one item of user ID (e.g., ID1), a kind of device (e.g., Device1), a message content (e.g., Teahun's invite: F1 Racing), Accept, Reject, and Block. The user ID is user identification information, and the kind of device indicates a kind of external apparatus. For example, the kind of device may be a name of the game console.

The user may accept invitation by selecting an accept item, and may reject the invitation in the case of selecting a reject item. If the user selects a block item, the user requests a block for a user requesting the invitation to the server 300.

Figure 6:
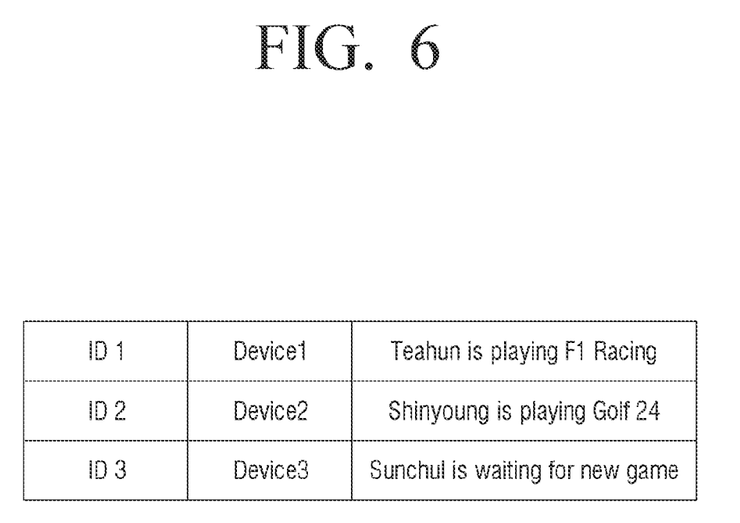
FIG. 6 is a diagram illustrating a pop-up message according to another example embodiment.

FIG. 6 is a diagram illustrating a pop-up message according to another example embodiment.

As illustrated in FIG. 6, the pop-up message according to an example embodiment may be a message indicating the user information to the information of friends. The user information message may include at least one item of user IDs (e.g., ID1, ID2, and ID3), kinds of devices (e.g., Device1, Device2, and Device3), and state information of the user (e.g., Teahun is playing F1 Racing). The user ID is user identification information, and the kind of devices indicates a kind of external apparatuses. For example, the kind of devices may be a name of the game console. The state information of the user is information indicating a current state of the user. For example, the current state of the user may be playing the game or waiting the game matching. It may be seen from the example embodiment of FIG. 6 that the user of ID1 enjoys the game using the Device1 and plays an F1 racing game. The display apparatus 100 receives the message and displays the message on the screen.

Figure 7:
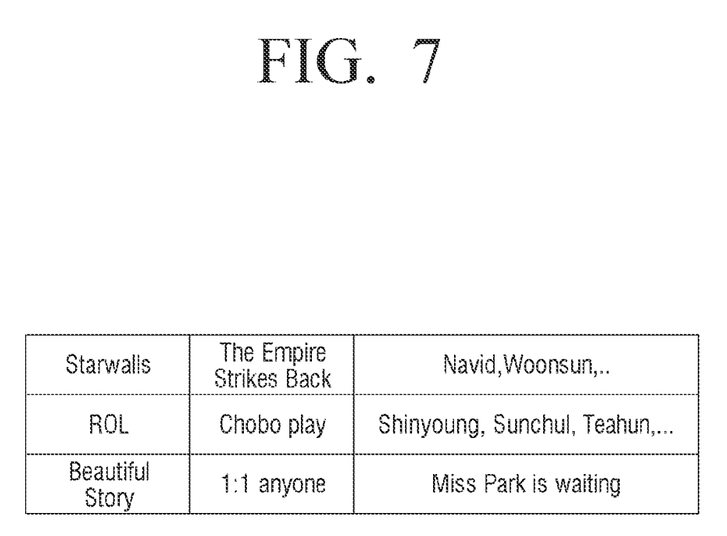
FIG. 7 is a diagram illustrating a pop-up message according to still another example embodiment.

FIG. 7 is a diagram illustrating a pop-up message according to still another example embodiment.

As illustrated in FIG. 7, the pop-up message according to still another example embodiment may be a message indicating information of an ongoing game. The game information message may include at least one item of a game title (e.g., Starwalls, ROL, Beautiful Story, etc.), a matching room title (e.g., The Empire Strikes Back, Chobo play, 1:1 anyone), participant information (e.g., Navid, Woonsun, . . . ). The game title indicates game title information, the matching room title indicates the game matching room title generated by a game participant, and the participant information indicates identification information of the user participating in the matching game. If there is a request from the user, the display apparatus 100 receives the message from the server 300 and displays the message on the screen.

A method for providing contents according to various example embodiments will be described below.

Figure 8:
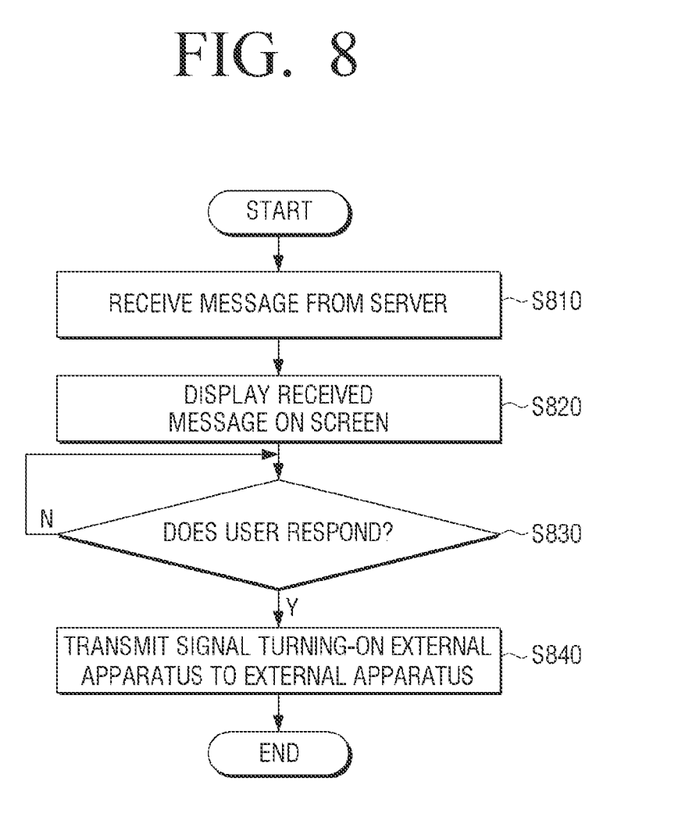
FIGS. 8 and 9 are flow charts illustrating a method for providing contents according to an example embodiment.
Figure 9:
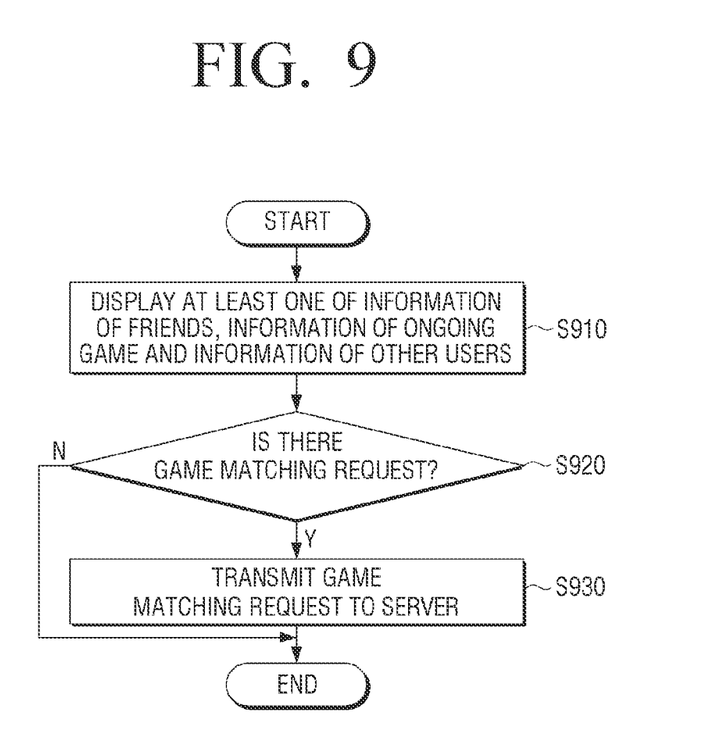

FIGS. 8 and 9 are flow charts of a method for providing contents according to an example embodiment.

Referring to FIG. 8, the method for providing contents according to an example embodiment includes an operation (S810) of receiving a message from a server, an operation (S820) of displaying the received message on a screen, and an operation (S840) of transmitting a signal turning-on an external apparatus to the external apparatus, when a user command responding to the displayed message is input (Yes in S830).

In this case, the received message may include at least one of a contents title, identification information of other users, and state information of other users.

In addition, the received message includes a game matching request message from other users, and in the operation of transmitting the signal turning-on the external apparatus, when the user command corresponding to the game matching request message to accept the game matching request message is input, the signal turning-on the external apparatus may be transmitted to the external apparatus.

In addition, the external apparatus may be a game console.

In addition, in the operation of transmitting the signal turning-on the external apparatus to the external apparatus, communication with the external apparatus may be performed by using any one of a fast wired interface, web-API, and wake-on-LAN.

In this case, the fast wired interface may be any one of a high definition multimedia interface (HDMI), a mobile high-definition link (MHL), and a digital interactive interface for video & audio (DiiVa).

In addition, the method may further include an operation of receiving and displaying a contents screen from the external apparatus when the external apparatus is turned-on.

In addition, the method may further include an operation of transmitting a game matching request to the server when a user command requesting a game matching with other users is input.

In addition, referring to FIG. 9, a method for providing contents according to another example embodiment includes an operation (S910) of displaying at least one of information of friends, information of an ongoing game, and information of other users, and an operation (S930) of transmitting a game matching request to a server if there is the game matching request (Yes in S920).

According to another example aspect, a method for providing contents includes: displaying at least one of information of friends, information of an ongoing game, and information of other users, and transmitting a game matching request to a server if there is the game matching request.

According to various example embodiments as described above, the user may let the contents execution wait in the state in which the external apparatus is turned-off while watching other contents through the display apparatus, and immediately turn-on the external apparatus in the case in which the contents of the external apparatus need to be executed.

Meanwhile, the methods for providing contents described above may be stored in a non-transitory computer-readable record medium in a program form. The non-transitory computer-readable medium does not mean a medium storing data for a short period such as a register, a cache, or the like, but means an electronic device-readable medium semi-permanently storing the data. For example, the non-transitory computer-readable medium may be CD, DVD, a hard disc, Blu-ray disc, USB, a memory card, ROM, or the like.

In addition, the methods for providing contents described above may be provided so as to be embedded in a hardware IC chip in an embedded software form, and may be included as a configuration of the display apparatus 100 described above.

According to various example embodiments as described above, the user may let a contents execution of the external apparatus wait such as waiting the game matching, requesting the game matching, or the like while watching other contents through the display apparatus, and in this case, since a state in which power of the external apparatus is turned-off is maintained, power is also saved. In addition, in the case in which the contents of the external apparatus need to be executed during the watching of other contents, the user may immediately turn-on the external apparatus.

Although the example embodiments have been shown and described, it should be understood that the disclosure is not limited to the disclosed embodiments and may be variously changed without departing from the spirit and the scope of the present disclosure. Therefore, the present disclosure should be construed as including all the changes, equivalents, and substitutions included in the spirit and scope of the present disclosure.

What is claimed is:

1. A display apparatus comprising:
   first communication circuitry configured to communicate with a server;
   second communication circuitry configured to communicate with an external apparatus;
   a display configured to display a message received from the server through the first communication circuitry; and
   a controller configured to control the second communication circuitry to transmit a signal turning-on the external apparatus to the external apparatus, in response to a command responding to the displayed message being received.

2. The display apparatus as claimed in claim 1, wherein the message received from the server includes at least one of a contents title, identification information of other users, and state information of other users.

3. The display apparatus as claimed in claim 1, wherein the message received from the server includes a game matching request message from other users, and
   the controller is configured to control the second communication circuitry to transmit the signal turning-on the external apparatus to the external apparatus, in response to a command corresponding to the game matching request message to accept the game matching request message being received.

4. The display apparatus as claimed in claim 1, wherein the message received from the server includes a game matching request message, and
   the controller is configured to not transmit the signal turning-on the external apparatus to the external apparatus, in response to the command corresponding to the game matching request message to reject the game matching request message being received.

5. The display apparatus as claimed in claim 1, wherein the external apparatus is a game console.

6. The display apparatus as claimed in claim 1, wherein the second communication circuitry communicates with the external apparatus using any one of a fast wired interface, web-API, and wake-on-LAN.

7. The display apparatus as claimed in claim 6, wherein the fast wired interface is any one of a high definition multimedia interface (HDMI), a mobile high-definition link (MHL), and a digital interactive interface for video & audio (DiiVa).

8. The display apparatus as claimed in claim 1, wherein the display displays at least one of information of friends, information of ongoing game, and information of other users.

9. The display apparatus as claimed in claim 1, wherein the controller is configured to control the display to receive and display a contents screen from the external apparatus, in response to the external apparatus being turned-on.

10. The display apparatus as claimed in claim 1, wherein the controller is configured to control the first communication circuitry to transmit a game matching request to the server, in response to the command requesting a game matching with other users being received.

11. A server comprising:
    communication circuitry configured to communicate with a display apparatus;
    a storage configured to receive and store user information from a game server; and
    a controller configured to control the communication circuitry to transmit a game matching request message to the display apparatus of a user included in a received game matching request, in response to the game matching request being received from the display apparatus.

12. A method for providing contents, comprising:
    receiving a message from a server;
    displaying the received message on a screen; and
    in response to a command responding to the displayed message being received, transmitting a signal turning-on an external apparatus to the external apparatus.

13. The method as claimed in claim 12, wherein the received message includes at least one of a contents title, identification information of other users, and state information of other users.

14. The method as claimed in claim 12, wherein the received message includes a game matching request message from other users, and
    wherein in response to a command corresponding to the game matching request message to accept the game matching request message being received, the signal turning-on the external apparatus is transmitted to the external apparatus.

15. The method as claimed in claim 12, wherein the external apparatus is a game console.

16. The method as claimed in claim 12, wherein in transmitting the signal turning-on the external apparatus, communication with the external apparatus is performed by using any one of a fast wired interface, web-API, and wake-on-LAN.

17. The method as claimed in claim 16, wherein the fast wired interface is any one of a high definition multimedia interface (HDMI), a mobile high-definition link (MHL), and a digital interactive interface for video & audio (DiiVa).

18. The method as claimed in claim 12, further comprising displaying at least one of information of friends, information of ongoing game, and information of other users.

19. The method as claimed in claim 12, further comprising receiving a contents screen from the external apparatus and displaying the contents screen from the external apparatus, in response to the external apparatus being turned-on.

20. The method as claimed in claim 12, further comprising transmitting a game matching request to the server, in response to the command requesting a game matching with other users being received.

* * * * *